(12) United States Patent
Lee et al.

(10) Patent No.: US 6,833,621 B2
(45) Date of Patent: Dec. 21, 2004

(54) METAL GASKET FOR A SEMICONDUCTOR FABRICATION CHAMBER

(75) Inventors: Tae-Won Lee, Incheon-shi (KR); Do-In Bae, Changwon-shi (KR); Guk-Kwang Kim, Suwon-shi (KR); Wan-Goo Hwang, Yongin-shi (KR); Jaung-Joo Kim, Suwon-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 10/315,230

(22) Filed: Dec. 10, 2002

(65) Prior Publication Data

US 2003/0122326 A1 Jul. 3, 2003

(30) Foreign Application Priority Data

Dec. 11, 2001 (KR) ........................................ 2001-78160

(51) Int. Cl.⁷ .......................... H01L 23/52; H01L 29/40
(52) U.S. Cl. ...................... 257/751; 257/767; 438/653; 277/654

(58) Field of Search .................................. 438/643, 653; 427/234, 239; 257/76, 751–767; 118/678, 733; 277/406, 595, 654

(56) References Cited

U.S. PATENT DOCUMENTS

| 3,634,048 A | * | 1/1972 | Koons et al. ............... 29/196.6 |
| 5,294,486 A | * | 3/1994 | Paunovic et al. ........... 428/672 |
| 6,528,185 B2 | * | 3/2003 | Man et al. ................... 428/675 |

* cited by examiner

Primary Examiner—Matthew Smith
Assistant Examiner—Calvin Lee
(74) Attorney, Agent, or Firm—Lee & Sterba, P.C.

(57) ABSTRACT

A metal gasket for a semiconductor fabrication chamber capable of preventing base plate metal contamination in the chamber, wherein the metal gasket includes a diffusion barrier layer interposed between a base plate and an anti-corrosive coating layer, and wherein the diffusion barrier layer prevents elements of the base plate from being diffused to the anti-corrosive coating layer. Accordingly, the diffusion barrier layer prevents attack on the anti-corrosive coating layer.

7 Claims, 5 Drawing Sheets

METAL GASKET FOR A SEMICONDUCTOR FABRICATION CHAMBER

BACKGROUND OF THE INVENTION

1. Field of the Invention

The present invention relates to a metal gasket. More particularly, the present invention relates to a metal gasket for a semiconductor fabrication chamber that is capable of preventing metal contamination in the chamber.

2. Description of the Related Art

With the trend in semiconductor devices toward high function and high density, it is very important to reduce contamination in semiconductor fabricating apparatuses and processes. A semiconductor fabricating process is performed using various apparatuses, such as a diffusion furnace for growing a layer or diffusing impurities at a high temperature, a plasma apparatus for chemical vapor deposition (CVD) or etching under a high vacuum, and an apparatus for implanting ions or depositing metals.

A plasma apparatus activates a gas using a high frequency power and creates plasma with high-energy ions or radicals to form or etch a thin film. Therefore, because plasma causes arcing of a plasma reactor, sputtering, and stripping of reactive byproducts, the plasma apparatus acts as a main source of contamination in a semiconductor fabricating process.

During the semiconductor fabricating process, particles may be created and metal ions may be contaminated. The particles and the metal ion contamination may result in a defective pattern, poor pressure resistance of an insulating layer, generation of a junction leakage current, and shortening of a semiconductor device lifetime. That is, semiconductor devices may be critically damaged by such contamination.

Accordingly, sources of contamination and methods for the removal thereof have been actively studied. To remove contamination sources in a semiconductor fabricating process using plasma, various approaches, such as varying the material and structure of a semiconductor fabricating apparatus and changing or adding a process, have been studied and applied recently.

The following tables, TABLE 1 and TABLE 2, present PN & RTN (rapid thermal nitridation), HDP (high density plasma), and SiN (silicon nitride) process conditions and resulting levels of metal contamination.

TABLE 1

| Process | Process Temperature | Process Gas | In-situ CLN Gas | Cu Contamination |
|---|---|---|---|---|
| PN & RTN | 888° C. | $PH_3$, $NH_3$ | — | E12 - E13 |
| HSG ISPC | 750° C. | $Si_2H_6$ or $SiH_4$ | SF6 (currently not applied) | E12 |
| NO ISPC | 750° C. | | — | E10 or less |
| HDP | 650° C. | $SiH_4$, $O_2$, Ar, $NF_6$ | — | E10 or less |
| MT-SiN | 750° C. | $SiH_4$, $NH_3$ | — | E10 or less |

TABLE 2

Metal Contamination Level Test Results of Each Line/Maker: 1E10 atoms/$cm^2$

| | 01 Line | | | | 02 Line | | | | 03 Line | | | |
|---|---|---|---|---|---|---|---|---|---|---|---|---|
| | HDP | HSG | Tube PN | RTN | HDP | HSG | Tube PN | RTN | HDP | HSG | Tube PN | RTN |
| Cu | 0.5 or less | 0.5 or less | 0.5 or less | 192.6 | 0.5 or less | 0.5 or less | 0.5 or less | 708.3 | 0.5 or less | 0.5 or less | — | 116.9 |
| Fe | 0.5 or less | 0.5 or less | 0.5 or less | 22.5 | 0.5 or less | 0.5 or less | 0.5 or less | 0.5 or less | 0.5 or less | 0.5 or less | — | 0.5 or less |
| Ni | 0.5 or less | 0.5 or less | 0.5 or less | 98.7 | 0.5 or less | 0.5 or less | 0.5 or less | 19.2 | 0.5 or less | 0.5 or less | — | 7.6 |

TABLE 2 shows that the contamination level of copper (Cu) is very high in the PN & RTN process. A search for the source of the Cu contamination indicates that an Au anti-corrosive coating layer of an Au-coated Cu gasket for an airtight vacuum is attacked, exposing a Cu layer of a base plate. Since the Au coated Cu gasket is installed below a chamber, the exposure of the Cu layer results in contamination of the chamber. Since a Cu gasket is generally highly corrosive, a chamber using $NH_3$ gas employs the Au-coated Cu gasket. Nonetheless, the Au is inevitably attacked and the chamber contaminated with Cu due to a corrosive gas and others. The damage of the Au-coated Cu gasket results from a corrosive gas (e.g., $PH_3$ or $NH_3$) and relatively high process temperatures.

Various analysis techniques are used to analyze elements of reaction products that are produced on a surface of a used Cu gasket, some of which are explained in detail below.

In analysis using an energy dispersive X-ray spectrometer (EDX), Cu, O, and P are detected and the reaction products are determined to be Cu—O oxide and Cu—P compound. In analysis using a scanning electron microscope (SEM) relative to a gasket base plate surface where the reaction products are stripped, Cu and O are detected as main elements. These results show that the reaction products are stripped to expose the Cu layer, which acts as the Cu contamination source of the chamber. In analysis of phases of the reaction products using an X-ray diffractometer (XRD), six kinds of phases are detected, as shown in FIG. 6. As main phases, CuO and $Cu_2O$ are detected. The conclusion attained from the XRD analysis result is that each of the phases is gradationally formed.

A mimetic diagram of reaction products produced at a conventional Au-coated Cu gasket is illustrated in FIG. 7.

Referring to FIG. 7, a Cu gasket initially has a layer type of Cu/Au. After being installed at a chamber, the Cu gasket has a layer type of Cu/Au/Au—Cu/Cu$_2$O/CuO, Cu$_3$P because a process temperature rises and a corrosive gas is used. However, since an unused gasket retains a layer type of Cu/Au, a source of Cu is needed for making such reaction phases. Namely, in order to change the Cu/Au into the Cu/Au/Au—Cu/Cu$_2$O/CuO, Cu$_3$P, the Cu must be diffused to the Au.

Therefore, Cu-to-Au diffusion is needed for producing reaction products of the foregoing type. According to "Metals Handbook, Surface Engineering of Nonferrous Metals," ASM International, it is reported that Cu is diffused to Au because a temperature at a Cu/Au interface rises. A diffusion coefficient of Cu is much greater than that of Au. The Cu and Au have the same lattice structure and are subjected to a complete solid solubility within all composition ranges. Thus, the Cu is diffused to the Au due to the increase in temperature. A diffusion speed of Cu is high and an atom size thereof is small. The Cu is attacked by ammonia (NH$_3$), which is very corrosive to Cu, from a surface of Cu oxide and an area where reaction products are stripped. As a result, since the Cu elements are separated and transferred to a chamber, not only the chamber but also a wafer are contaminated.

SUMMARY OF THE INVENTION

As described above, when an anti-corrosive layer of an anti-corrosive coated gasket used in a semiconductor fabrication chamber is damaged, base elements are diffused to the chamber, causing metal contamination of the semiconductor fabrication chamber. Accordingly, it is a feature of an embodiment of the present invention to provide a metal gasket that is capable of preventing metal contamination.

In order to provide this and other features, a metal gasket for a semiconductor fabrication chamber is provided, including a base plate, a diffusion barrier layer and an anti-corrosive coating layer, wherein the diffusion barrier layer and the anti-corrosive coating layer are sequentially formed on the base plate to prevent elements of the base plate from being diffused to the anti-corrosive coating layer when a process is performed in the semiconductor fabrication chamber. Preferably, the base plate is made of Cu, and the anti-corrosive layer is made of Au. Further, the diffusion barrier layer is preferably made of one selected from the group consisting of Ti, W, TiN, and Ni.

The diffusion barrier layer may include a first diffusion barrier layer and a second diffusion barrier layer. In a two-layer construction, preferably, the first diffusion barrier layer is made of Cr and the second diffusion barrier layer is made of Ni.

Preferably, a metal gasket according to the present invention may be used in a semiconductor fabrication chamber when a corrosive gas is used as a process gas, and may be installed at a chamber where a metal is deposited at a relatively high temperature, e.g., 700° C. or higher.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
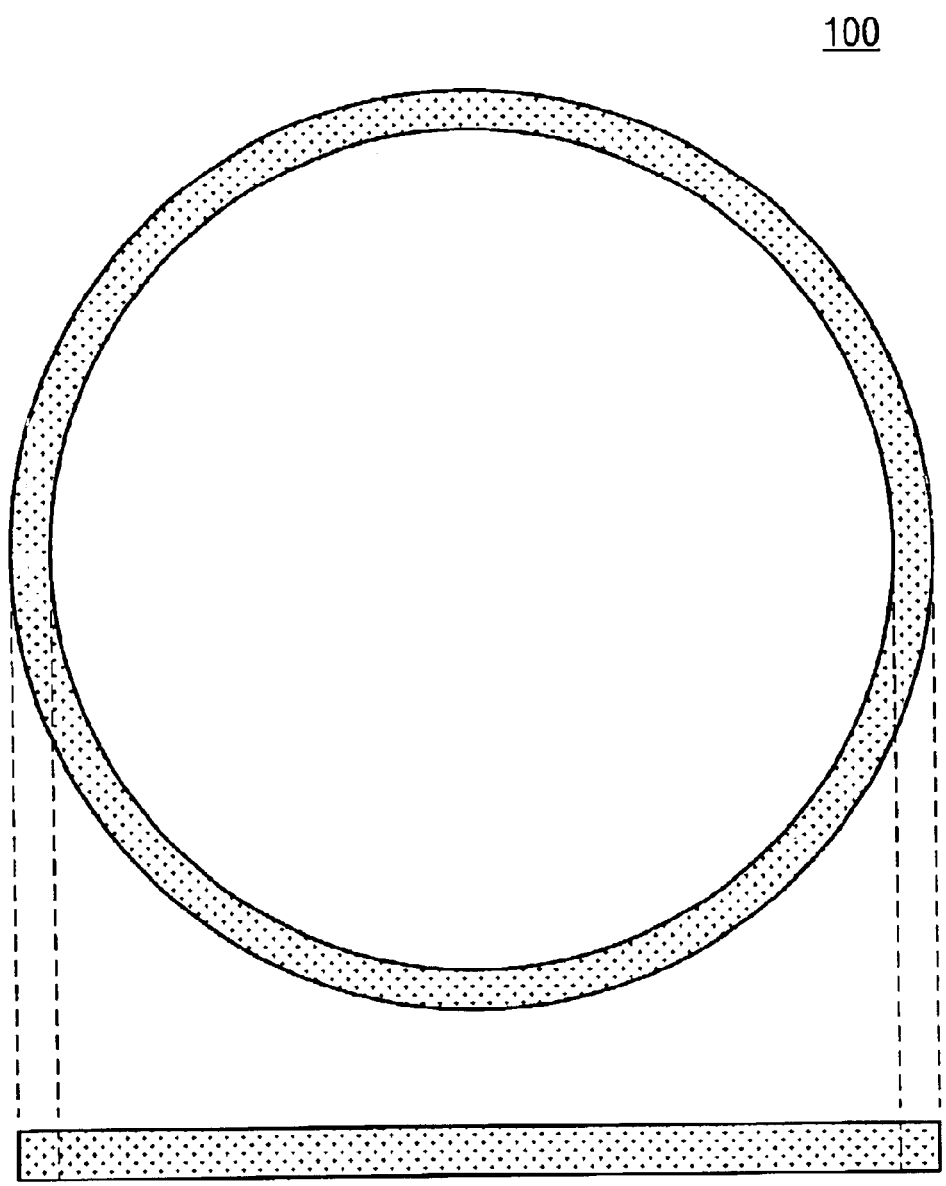
FIG. 1 illustrates an exemplary diagram of a ring-type metal gasket according to a preferred embodiment of the present invention.

Korean Patent Application No. 2001-78160, filed Dec. 11, 2001, and entitled: "Metal Gasket for Semiconductor Fabrication Chamber," is incorporated by reference herein in its entirety.

The present invention will now be described more fully hereinafter with reference to the accompanying drawings, in which preferred embodiments of the invention are shown. The present invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. It will also be understood that when a layer is referred to as being "on" another layer or substrate, it can be directly on the other layer or substrate, or intervening layers may also be present. Similarly, it will also be understood that when a layer is referred to as being "between" two layers, it can be the only layer between the two layers, or one or more intervening layers may also be present. Like numbers refer to like elements throughout.

A ring-type metal gasket according to a preferred embodiment of the present invention is exemplarily illustrated in FIG. 1. The metal gasket 100 is mainly used to seal connecting parts in a high-vacuum chamber.

Figure 2:
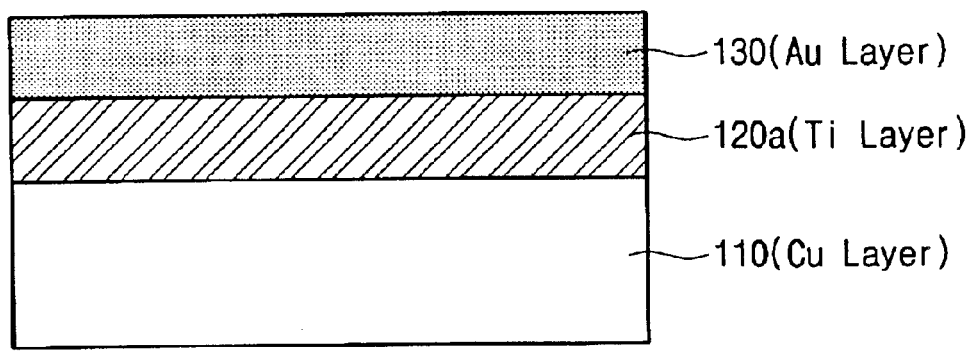
FIG. 2 illustrates a cross-sectional view of a metal gasket according to a preferred embodiment of the present invention.

Referring now to FIG. 2, a metal gasket 100a for a semiconductor fabrication chamber includes a base plate 110, a diffusion barrier layer 120a formed on a surface of the base plate, and an anti-corrosive/etch resistant layer 130 formed on the diffusion barrier layer. The base plate 110, the diffusion barrier layer 120a, and the anti-corrosion/etch-resistant layer 130 are preferably made of Cu, Ti, and Au, respectively. When a process is performed using the metal gasket 100a, the Cu elements of the base plate 110 are diffused toward the anti-corrosive/etch resistant layer 130 due to an increase in temperature and presence of a corrosive gas. The diffusion barrier layer 120a, however, prevents the diffusion of the Cu elements to the anti-corrosive/etch resistant layer 130.

Figure 3:
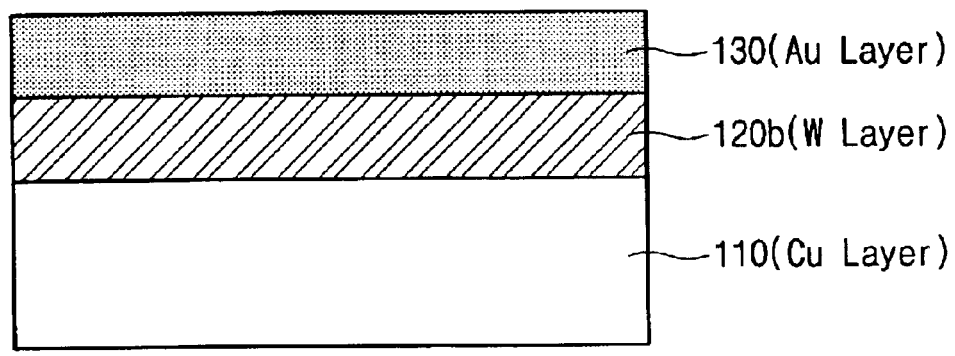
FIGS. 3-5 illustrate cross-sectional views of alternate configurations of a diffusion barrier layer in a metal gasket according to a preferred embodiment of the present invention.
Figure 4:
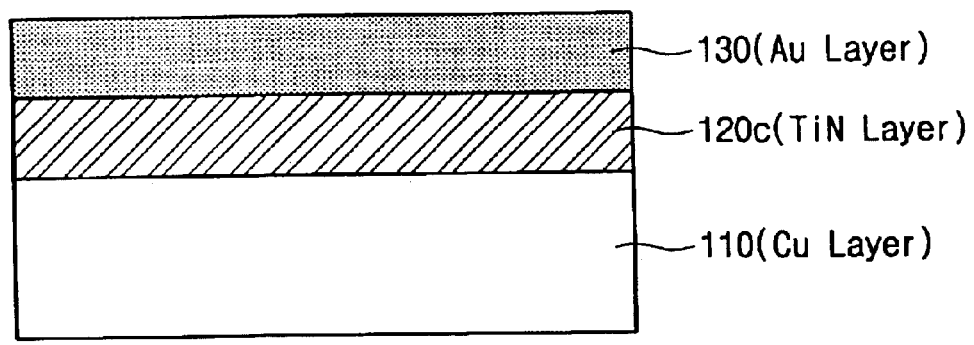

Alternatively, as shown in FIGS. 3 and 4, respectively, the diffusion barrier layer 120b of metal gasket 100b may be made of W, or the diffusion barrier layer 120c of metal gasket 100c may be made of TiN.

Figure 5:
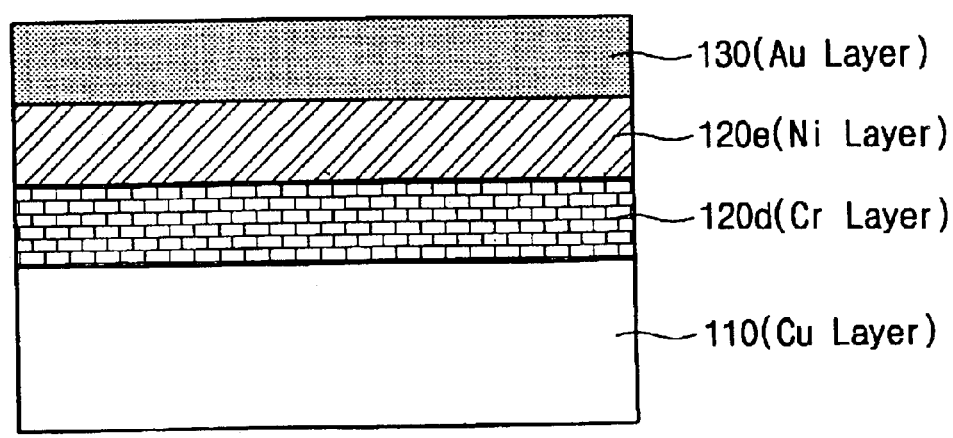
Figure 6:
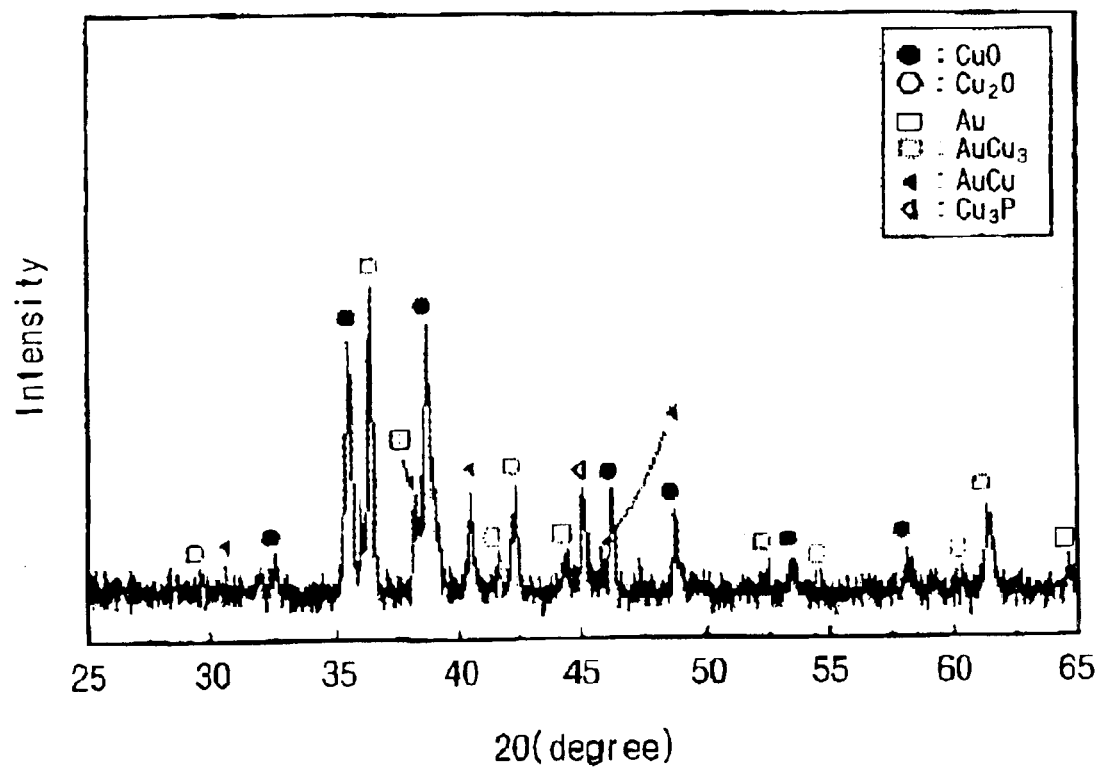
FIG. 6 is a graph showing X-ray diffractometer (XRD) analysis results of reaction products that are produced at a conventional Cu gasket.
Figure 7:
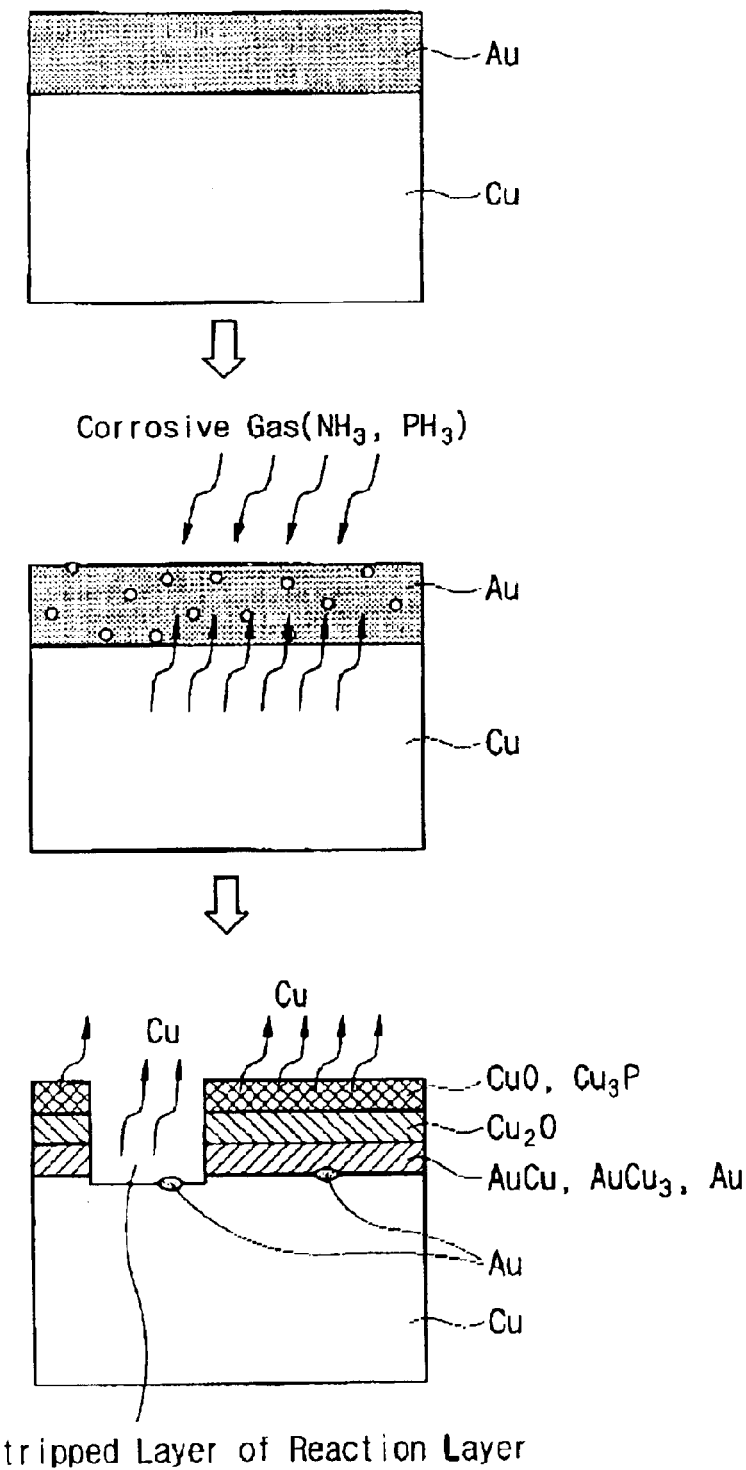
FIG. 7 illustrates a mimetic diagram of the reaction products that are produced at a conventional Cu gasket.

In addition, as shown in FIG. 5, the diffusion barrier layer 120d and 120e of metal gasket 100d may have a multi-layer structure including a first diffusion barrier layer 120d made of Cr and a second diffusion barrier layer 120e made of Ni.

A metal gasket according to any of the embodiments of the present invention is suitable for use when corrosive gases PH₃ and NH₃ are used during a chemical vapor deposition (CVD) process, and may be most advantageously used in a semiconductor fabrication chamber wherein a process is performed at a relatively high temperature, such as 700° C. or higher.

The metal gasket of any of the embodiments of the present invention may be characterized by the diffusion barrier layer 120a, 120b, 120c, or 120d and 120e being interposed between the base plate 110 and the anti-corrosive/etch resistant layer 130. Generally, an interior of a chamber is contaminated as the Cu elements of a base plate are diffused to an anti-corrosive layer in conventional metal gaskets for semiconductor fabricating equipment. Advantageously, the diffusion barrier layer of the present invention prevents the diffusion of the base plate elements so that the interior of the chamber is not contaminated. Thus, use of the metal gasket for a semiconductor fabrication chamber of the present invention reduces a level of metal contamination in the chamber, thereby enhancing the quality of semiconductor devices fabricated therein.

The mechanism by which the anti-corrosive coated layer prevents diffusion of the base plate elements will now be explained in detail. When metals are in direct contact with each other, diffusion occurs if the metal materials are activated. The most significant factor for activating metal materials is temperature. That is, when two metals in direct contact reach or exceed a predetermined temperature, atoms are diffused from one metal to the other. Due to the diffusion, compounds (reaction products) may be produced at an interface between the two metals. Alternatively, the atoms may be diffused without producing the reaction products to be hardened. Because of the hardening, atoms of "A" metal are diffused to "B" metal to occupy a position of a B atom or a position between B atoms. However, there is a limitation to hardening of metals. In a case where a solid solubility of one metal is lower than that of the other metal, problems caused by diffusion do not occur. Further, if reactivity does not exist between metals, diffusion is also suppressed.

In view of the foregoing, the diffusion barrier layer of the present invention may be made of one selected from the group consisting of Ti, W, TiN, and Ni. Since W and TiN have a high fusion point and a low reactivity on Cu and Au used in the present invention, they may prevent diffusion of the atoms. Since Ti has a very low solid solubility with materials used in the metal gasket according to the present invention, a compound is formed at an interface, which may prevent diffusion of the materials. Ni has a high solid solubility with the materials used in the metal gasket according to the present invention, also preventing problems of diffusion.

As mentioned above, in order for materials to diffuse, the materials must be activated. The most common way in which materials are activated is due to an increase in a process temperature. However, the materials of a metal gasket according to the present invention are not activated at a temperature reached in a semiconductor fabrication chamber. Accordingly, it is possible to prevent the diffusion of the materials.

An electroplating or sputtering technique may be adopted as a method of forming the diffusion barrier layer and the anti-corrosive coated layer. The Au, W, and Ni coating layers may be coated with Cu by the electroplating and sputtering techniques, and the Ti and TiN coating layers may be coated with Cu by the sputtering technique.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A metal gasket for a semiconductor fabrication chamber, comprising:

a base plate;

a diffusion barrier layer; and an anti-corrosive coating layer, wherein the diffusion barrier layer and the anti-corrosive coating layer are sequentially formed on the base plate to prevent and the diffusion barrier layer is made of a material capable of preventing elements of the base plate from being diffused to the anti-corrosive coating layer when a process is performed in the semiconductor fabrication chamber.

2. The metal gasket as claimed in claim 1, wherein the beam plate made of Cu.

3. The metal gasket as claimed in claim 1, wherein the anti-corrosive layer is made of Au.

4. The metal gasket as claimed in claim 1, wherein the diffusion barrier layer is made of one selected from the group consisting of Ti, W, TiN, and Ni.

5. The metal gasket as claimed in claim 1, wherein the diffusion barrier layer includes a first diffusion barrier layer and a second diffusion barrier layer.

6. The metal gasket as claimed in claim 1, wherein the first diffusion barrier layer is made Cr and the second diffusion barrier layer is made of Ni.

7. The metal gasket as claimed in claim 1, wherein the metal gasket is used in a semiconductor fabrication chamber when a corrosive gas is used as a process gas, and is installed at a chamber where a metal is deposited at a temperatures of 700° C. or higher.

* * * * *